(12) United States Patent
Kunisada

(10) Patent No.: US 9,446,738 B2
(45) Date of Patent: Sep. 20, 2016

(54) MOTORCYCLE IMMOBILIZER AMPLIFIER MOUNT STRUCTURE

(71) Applicant: Kawasaki Jukogyo Kabushiki Kaisha, Kobe-shi, Hyogo (JP)

(72) Inventor: Youhei Kunisada, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 14/879,994

(22) Filed: Oct. 9, 2015

(65) Prior Publication Data

US 2016/0031415 A1    Feb. 4, 2016

Related U.S. Application Data

(63) Continuation of application No. PCT/JP2014/050950, filed on Jan. 20, 2014.

(30) Foreign Application Priority Data

Apr. 25, 2013    (JP) ................. 2013-092460

(51) Int. Cl.
    B60R 25/04       (2013.01)
    B62M 25/00       (2006.01)
    (Continued)

(52) U.S. Cl.
    CPC ........... B60R 25/04 (2013.01); B60R 16/0239 (2013.01); B62H 5/08 (2013.01); B62K 11/02 (2013.01); B62M 25/00 (2013.01); *B62J 2099/004* (2013.01)

(58) Field of Classification Search
    CPC ...... B60R 25/04; B62M 25/00; B62K 11/02; B62J 2099/004

USPC .......................................... 180/218, 219, 220
See application file for complete search history.

(56) References Cited

U.S. PATENT DOCUMENTS 5,634,358 A * 6/1997 Myers ..................... B62H 5/02
                                           70/185
8,162,101 B2    4/2012   Ono
(Continued)

FOREIGN PATENT DOCUMENTS

JP     2008-179274     8/2008
JP     2010-095244     4/2010

OTHER PUBLICATIONS

International Preliminary Report on Patentability and Written Opinion of the International Searching Authority dated Nov. 5, 2015 for International PCT Patent Application No. PCT/JP2014/050950, filed Jan. 20, 2014 (8 pages).

(Continued)

*Primary Examiner* — Tony Winner

(57) ABSTRACT

A motorcycle immobilizer amplifier mount structure that allows arrangement in the front portion of a motorcycle body to be simplified while reducing the size of an ignition switch, and prevents an immobilizer amplifier from being exposed to a high temperature of a combustion engine. In the immobilizer amplifier mount structure, immobilization signal output section is incorporated in an ignition switch unit, and the immobilizer amplifier amplifies an immobilization signal from the immobilization signal output section, and is mounted rearward of a cylinder head of the combustion engine on an inner surface of an intermediate portion, in a longitudinal direction, in a pair of left and right frame pieces forming a part of a motorcycle frame structure.

6 Claims, 6 Drawing Sheets

(51) Int. Cl.
    *B62K 11/02*    (2006.01)
    *B60R 16/023*   (2006.01)
    *B62H 5/08*     (2006.01)
    *B62J 99/00*    (2009.01)

(56) References Cited

U.S. PATENT DOCUMENTS

2006/0131959 A1*  6/2006  Nishijima .............. B60R 25/04
                                                    307/10.5
2006/0261674 A1* 11/2006  Unno ................ B60R 25/02153
                                                    307/10.1
2008/0209964 A1*  9/2008  Agostini ........... B60R 25/02153
                                                    70/252
2010/0071991 A1   3/2010  Ono

OTHER PUBLICATIONS

International Search Report for PCT/JP2014/050950, filed Jan. 20, 2014.

* cited by examiner

MOTORCYCLE IMMOBILIZER AMPLIFIER MOUNT STRUCTURE

CROSS REFERENCE TO THE RELATED APPLICATION

This application is a continuation application, under 35 U.S.C §111(a) of international application No. PCT/JP2014/050950, filed Jan. 20, 2014, which claims priority to Japanese patent application No. 2013-092460, filed Apr. 25, 2013, the entire disclosure of which is herein incorporated by reference as a part of this application.

BACKGROUND OF THE INVENTION

1. Field of the Invention

The present invention relates to an immobilizer amplifier mount structure by which an immobilizer amplifier, that forms an antitheft device for motorcycles in conjunction with immobilization signal output section, is mounted to a motorcycle frame structure.

2. Description of Related Art

As an antitheft device for vehicles such as motorcycles and four-wheel vehicles, an immobilizer system has been known in which an ID code (identification code for verification) unique to each vehicle is stored in an ignition key, and operation of the vehicle is electrically inhibited in the case of another ignition key being used. An immobilizer unit used in the immobilizer system has an immobilizer amplifier incorporated in an ignition switch, thereby increasing the size of the ignition switch.

In recent years, in some cases, the immobilizer amplifier is provided separately from the ignition switch, thereby reducing the size of the ignition switch. In this case, in order to facilitate wiring of signal lines for the ignition switch and to obtain cooling effect by incoming wind, the immobilizer amplifier is disposed in the front portion of the motorcycle body near the ignition switch, for example, disposed inside of side fairings. Separately from such a structure, a vehicle antitheft device has been suggested in which a vehicle-side communication device mounted to a motorcycle body receives an ID code, unique to the vehicle, transmitted from a helmet-side communication device mounted to a helmet for riders, and a control section for controlling operation of a power supply verifies the ID code (see Patent Document 1).

RELATED DOCUMENT

Patent Document

[Patent Document 1] JP Patent No. 4833876

However, in motorcycles, the front portion of the motorcycle body in which the immobilizer amplifier is disposed is in the vicinity of a combustion engine, whereby the immobilizer amplifier may suffer an adverse effect such as malfunction due to the immobilizer amplifier being exposed to high temperature. Further, in the front portion of the motorcycle body, many components such as an ignition switch, and a radiator or the like are disposed, whereby it is difficult to assuredly obtain a mounting space to stably support the immobilizer amplifier which is a large component, and hence, the mount structure for immobilizer amplifier tends to be complicated.

SUMMARY OF THE INVENTION

In view of the above problems, and an object of the present invention is to provide a motorcycle immobilizer amplifier mount structure that allows arrangement in the front portion of a motorcycle body to be simplified while reducing the size of an ignition switch, and prevents an immobilizer amplifier from being adversely affected by heat due to the immobilizer amplifier being exposed to a high temperature of a combustion engine.

In order to attain the above-mentioned object, a motorcycle immobilizer amplifier mount structure according to the present invention includes: an immobilization signal output section incorporated in an ignition switch unit; and an immobilizer amplifier configured to amplify an immobilization signal from the immobilization signal output section, the immobilizer amplifier being mounted rearward of a cylinder head of a combustion engine on an inner side surface of an intermediate portion, in a front-rear direction or longitudinal direction, in a pair of left and right frame pieces forming a part of a motorcycle frame structure. The intermediate portion represents a portion that is distant from a front end by ⅓ to ⅔ of the entire length of the motorcycle frame structure in the longitudinal direction.

In the immobilizer amplifier mount structure, the immobilizer amplifier is provided separately from the ignition switch unit having the immobilization signal output section incorporated therein, thereby enabling reduction in the size of the ignition switch unit. Further, the immobilizer amplifier is disposed in the intermediate portion, in the longitudinal direction, of the motorcycle frame structure, whereby arrangement of the ignition switch unit, a radiator, and the like provided in the front portion of the motorcycle body, can be simplified.

Further, the immobilizer amplifier is disposed rearward of a cylinder head of the combustion engine, and in the intermediate portion of the motorcycle frame structure in the longitudinal direction, which is distant from the front portion, of the motorcycle body, at which front portion the temperature tends to become high due to proximity to the combustion engine. Thus, the immobilizer amplifier is not greatly distant from the immobilization signal output section, and therefore, while wiring is facilitated, the immobilizer amplifier is less likely to suffer an adverse effect of heat due to the immobilizer amplifier being exposed to high temperature of the combustion engine. The immobilization signal output section is, for example, a switching circuit that operates according to operation of a key switch.

In the present invention, the immobilizer amplifier is preferably mounted to a portion, in the vicinity of an upper portion of a swing arm bracket, of the pair of left and right frame pieces. In general, in the vicinity of the upper portion of the swing arm bracket, there is a vacant space in many cases. Therefore, a mount space for the immobilizer amplifier can be assuredly obtained with ease.

In the present invention, the immobilizer amplifier is preferably mounted to the motorcycle frame structure through an amplifier bracket. According to the structural features, the immobilizer amplifier can be firmly mounted to the motorcycle frame structure with ease through the amplifier bracket.

When the immobilizer amplifier is mounted through the amplifier bracket, both the amplifier bracket and an engine mount are preferably fastened together by a common fastening member to an engine mount portion provided in the motorcycle frame structure, and the immobilizer amplifier is preferably mounted to the amplifier bracket. Thus, an existing engine mount portion is used to mount the amplifier bracket to a motorcycle frame structure, thereby simplifying a mount structure for the immobilizer amplifier.

When the immobilizer amplifier is mounted through the amplifier bracket, the amplifier bracket preferably includes a harness holding portion. Thus, a holding portion for a harness need not be separately provided, thereby improving the simplification of the structure. The harness refers to an electric wire that connects between electric components.

In the present invention, a shock absorber having a rear end portion joined to a swing arm that supports a rear wheel is preferably disposed at a center portion, in a widthwise direction, of a motorcycle body, a front end portion of the shock absorber is preferably joined to a cross member of the motorcycle frame structure, and the immobilizer amplifier is preferably disposed laterally outward of the front end portion of the shock absorber. In general, since there is a relatively wide vacant space located laterally outward of the front end portion of the shock absorber, a sufficient mount space for the immobilizer amplifier can be assuredly obtained.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, a preferred embodiment of the present invention will be described in detail with reference to the drawings.

Figure 1:
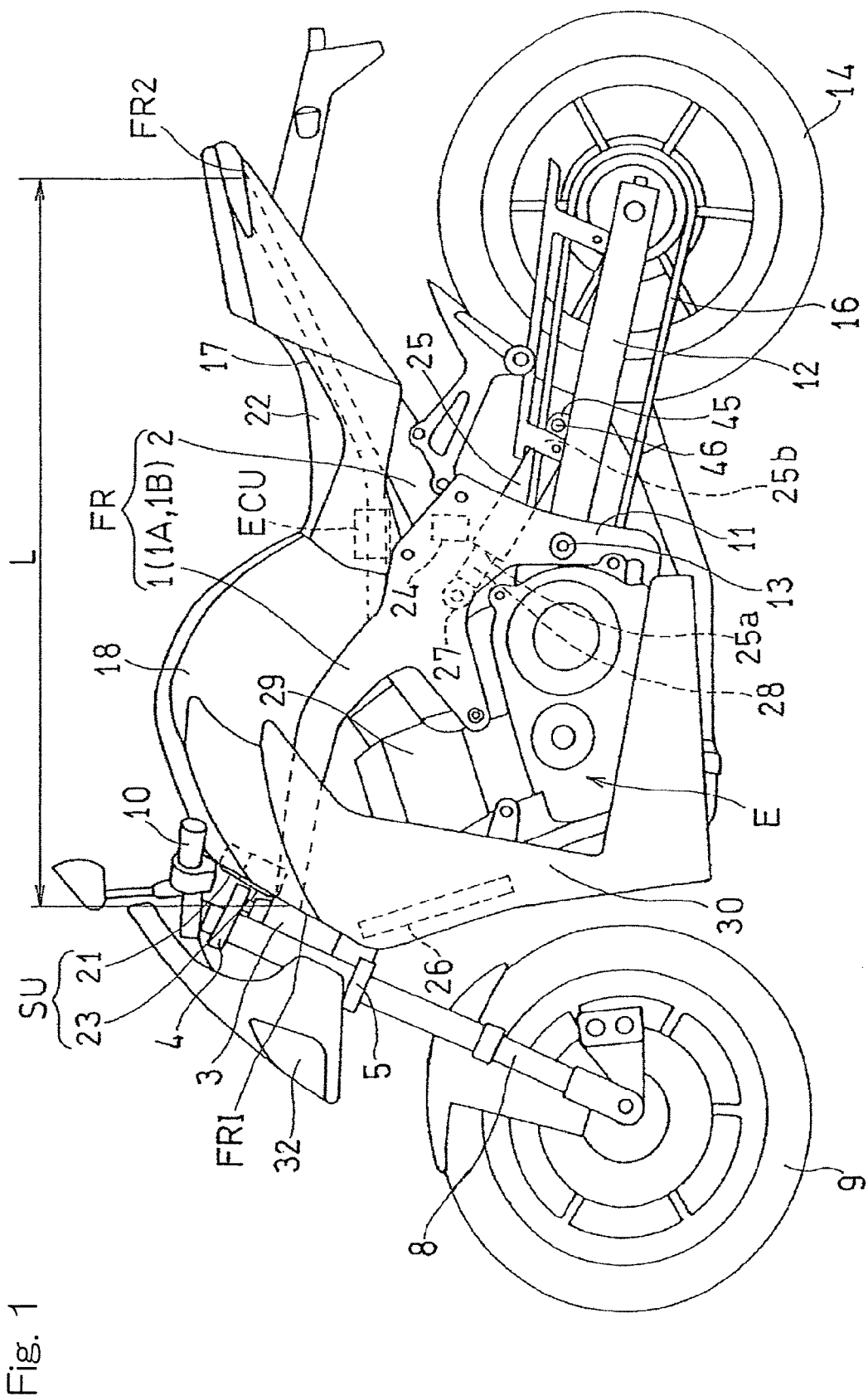
FIG. 1 is a side view illustrating a motorcycle including an immobilizer amplifier mount structure according to a preferred embodiment of the present invention.

FIG. 1 is a side view of a motorcycle including an immobilizer amplifier mount structure according to a preferred embodiment of the present invention. The motorcycle has a motorcycle frame structure FR, and the motorcycle frame structure FR includes a main frame 1 that forms a front half of the motorcycle frame structure FR, and a rear frame 2 that is joined to a rear portion of the main frame 1 and forms a rear half of the motorcycle frame structure FR. The main frame 1 has a pair of left and right main frame pieces 1A, 1B, and the rear frame 2 similarly has a pair of left and right rear frame pieces 2A, 2B. That is, the motorcycle frame structure FR has a pair of left and right frame pieces 1A, 2A and 1B, 2B.

A head pipe 3 is mounted to the front end of the main frame 1, and a steering shaft (not shown) is rotatably inserted in the head pipe 3. An upper bracket 4 and an under bracket 5 are mounted to the steering shaft (not shown). A front fork 8 is supported by the upper bracket 4 and the under bracket 5, and a front wheel 9 is supported at a lower end portion of the front fork 8. A steering handle 10 is mounted to the upper bracket 4 which is located at an upper end portion of the front fork 8.

A swing arm bracket 11 is provided at a rear end portion of the main frame 1. A swing arm 12 is supported by the swing arm bracket 11 via a pivot shaft 13 inserted in a front end portion of the swing arm 12 so as to be able to swing in the up-down direction. A rear wheel 14 is supported at a rear end portion of the swing arm 12. The swing arm bracket 11 is formed integrally with the main frame 1, or formed separately from the main frame 1 and jointed to the main frame 1 by means of welding or the like. A combustion engine E is supported by the main frame 1 at the intermediate portion thereof in the longitudinal direction and disposed below the main frame 1. The rear wheel 14 is driven by the engine E through a power transmission mechanism 16 such as a chain.

A rider's seat 22 is supported by the rear frame 2. A fuel tank 18 is mounted to an upper portion of the main frame 1, that is, at the upper portion of the motorcycle body, between the steering handle 10 and the rider's seat 22. A lower portion of a rear portion of the fuel tank 18 and the lower portion of the rider's seat 22 are covered by a side cover 17 from the lateral sides thereof. A pair of left and right side fairings 30 made of a resin are mounted in a front portion of the motorcycle body, and covers the lateral sides of the engine E and a region in front of the engine E. Inside the side fairings 30, 30, a radiator 26 for engine cooling water is disposed in front of a cylinder head 29. A headlamp unit 32 is supported by the upper bracket 4 and the under bracket 5.

An ignition switch unit (hereinafter, referred to as a switch unit) SU is disposed between the upper bracket 4 and the fuel tank 18, and includes an ignition switch 21, called a key switch, which has immobilization signal output section 23 incorporated therein. The immobilization signal output section 23 is a kind of a switching circuit. When an ignition key (not shown), in which an ID code unique to each vehicle is stored, is inserted into the ignition switch 21, the immobilization signal output section 23 outputs a weak immobilization signal corresponding to the ID code.

An immobilizer amplifier 24, that amplifies the immobilization signal outputted by the immobilization signal output section 23, is provided separately from the immobilization signal output section 23, and is disposed below and rearward of the immobilization signal output section 23 so as to be spaced from the immobilization signal output section 23. Specifically, the immobilizer amplifier 24 is disposed in the vicinity of the upper portion of the swing arm bracket 11, and at a position laterally outward of a front end portion 25a, of a shock absorber 25 for the rear wheel 14, which portion 25a is joined to a cross member 27 of the motorcycle frame structure FR. Further, the immobilizer amplifier 24 is disposed rearward of the cylinder head 29 of the engine E so as to be spaced from the cylinder head 29. That is, the immobilizer amplifier 24 is disposed at an intermediate portion, in the longitudinal direction, of the motorcycle frame structure FR having the main frame 1 and the rear frame 2.

The "intermediate portion, in the longitudinal direction, of the motorcycle frame structure FR" represents a portion that is distant from a front end FR1 by ⅓L to ⅔L, where L represents the entire length of the motorcycle frame structure FR from the front end FR1 to a rear end FR2. A mount position and mount structure for the immobilizer amplifier 24 will be described below in detail.

Figure 2:
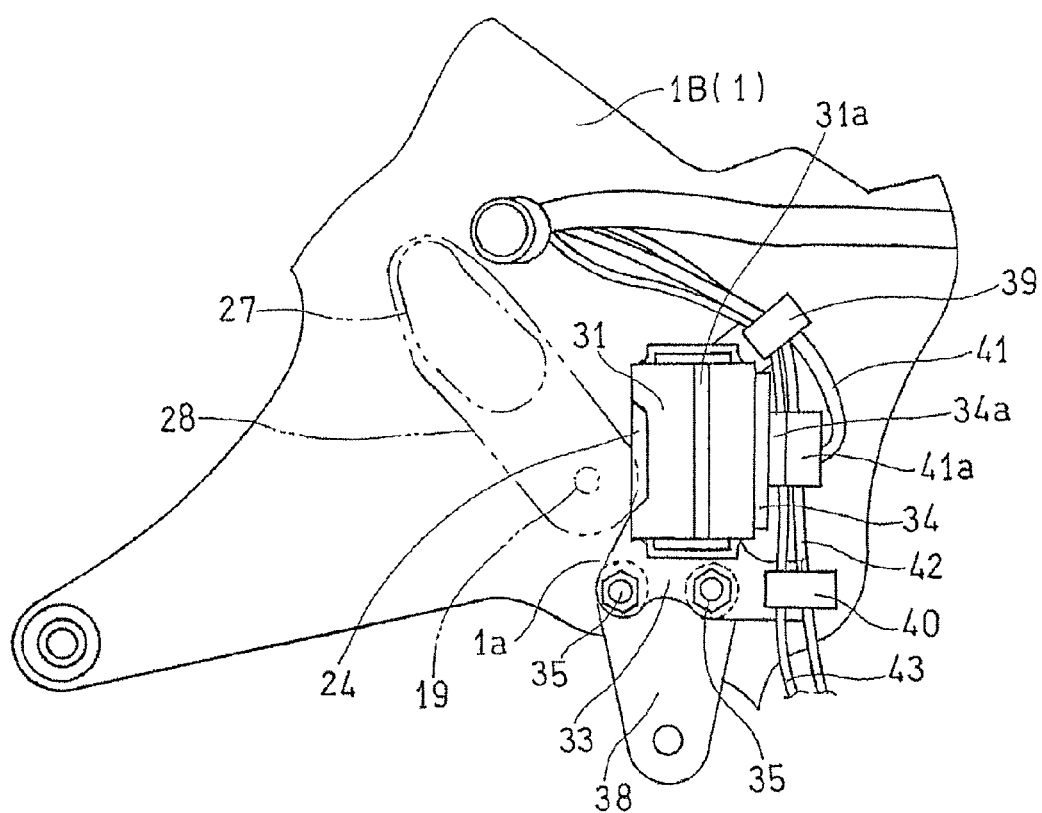
FIG. 2 is an enlarged side view of the immobilizer amplifier mount structure.

FIG. 2 is an enlarged side view of the immobilizer amplifier mount structure shown in FIG. 1. The immobilizer amplifier 24 has a flat rectangular-parallelepiped shape, and is fitted into and fixed to a rubber case 31. The rubber case 31 having the immobilizer amplifier 24 fitted thereinto and fixed thereto is mounted to an amplifier bracket 33. The amplifier bracket 33 and an engine mount 38 are both fastened by two common bolts 35 to an engine mount portion 1a of the main frame 1, so as to mount the amplifier bracket 33 to the main frame 1. This will be described below in detail.

Two harness holding portions 39, 40 for clamping harnesses are mounted to the amplifier bracket 33. An immobilization signal harness 41 through which an immobilization signal is transmitted from the immobilization signal output section 23 (FIG. 1) is inserted through and held by one of the harness holding portions, that is, the harness holding portion 39. A connector 41a provided at the tip end portion of the immobilization signal harness 41 is connected to an amplifier connector 34a of the immobilizer amplifier 24. A pulser signal harness 42 through which an ignition control signal is transmitted from a generator (not shown), and an oxygen sensor signal electric wire (hereinafter, the electric wire is referred to as a harness) 43 through which a signal from an oxygen sensor (not shown) in an exhaust system is transmitted, are inserted through and held by the other of the harness holding portions, that is, the harness holding portion 40.

Each of the immobilization signal harness 41, the pulser signal harness 42, and the oxygen sensor signal harness 43 is formed by stranded wires for noise prevention. An output signal from the immobilizer amplifier 24 is inputted through a not-illustrated signal harness to an engine control unit (ECU), and, for example, starting of the engine is disabled by an immobilizer circuit in the ECU, thereby electrically inhibiting operation of the motorcycle.

Figure 3:
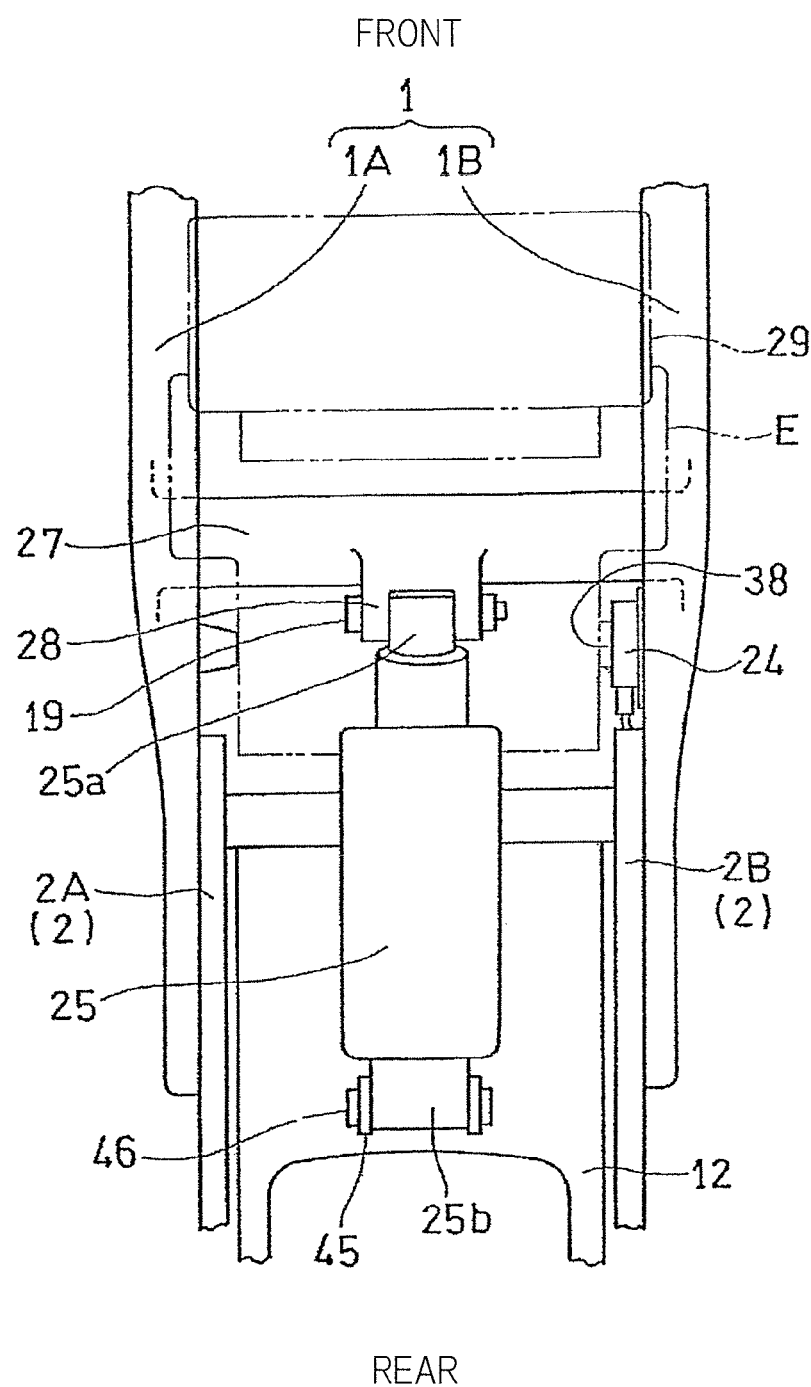
FIG. 3 is an enlarged plan view of the immobilizer amplifier mount structure.

FIG. 3 is an enlarged plan view of the immobilizer amplifier mount structure. As shown in FIG. 3, the shock absorber 25 for the rear wheel 14 is disposed at an intermediate portion, in the motorcycle widthwise direction, between the pair of left and right main frame pieces 1A and 1B of the main frame 1. The front end portion 25a of the shock absorber 25 is joined, by means of a bolt 19, to a mount bracket 28 provided to the cross member 27 that extends in the widthwise direction to connect the main frame pieces 1A and 1B. A rear end portion 25b of the shock absorber 25 is jointed, by means of a bolt 46, to a rear end mount bracket 45 provided at the swing arm 12. The immobilizer amplifier 24 is disposed in a vacant space laterally outward of the front end portion 25a of the shock absorber 25.

Figure 6:
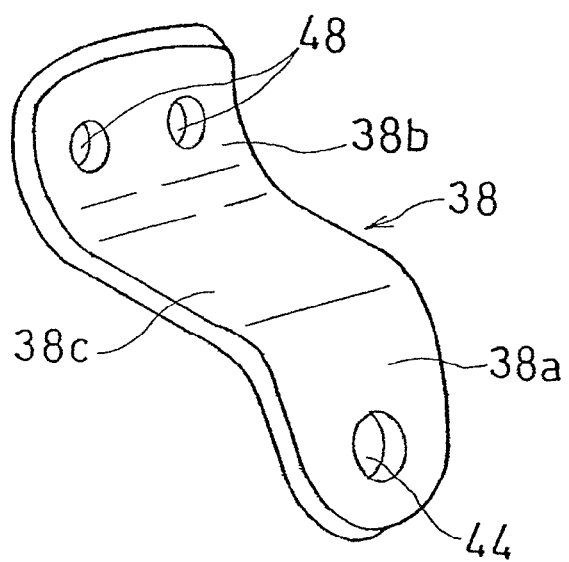
FIG. 6 is a perspective view of an engine mount used for the immobilizer amplifier mount structure.

The engine mount 38 shown in FIG. 2 is a conventionally used existing mount for supporting the engine E at the motorcycle frame structure FR. As shown in FIG. 6, the engine mount 38 has a support piece 38a, a mount piece 38b, and an intermediate piece 38c that are integrally formed by one metal plate being bent. The support piece 38a is provided with a support hole 44, and is joined to the engine E via the support hole 44. The mount piece 38b is provided with two mount holes 48, and is mounted to the main frame 1 via the two mount holes 48, 48. The intermediate piece 38c joins the support piece 38a and the mount piece 38b to each other. The support piece 38a and the mount piece 38b are substantially parallel with each other, and extend substantially in the vertical direction.

Figure 7:
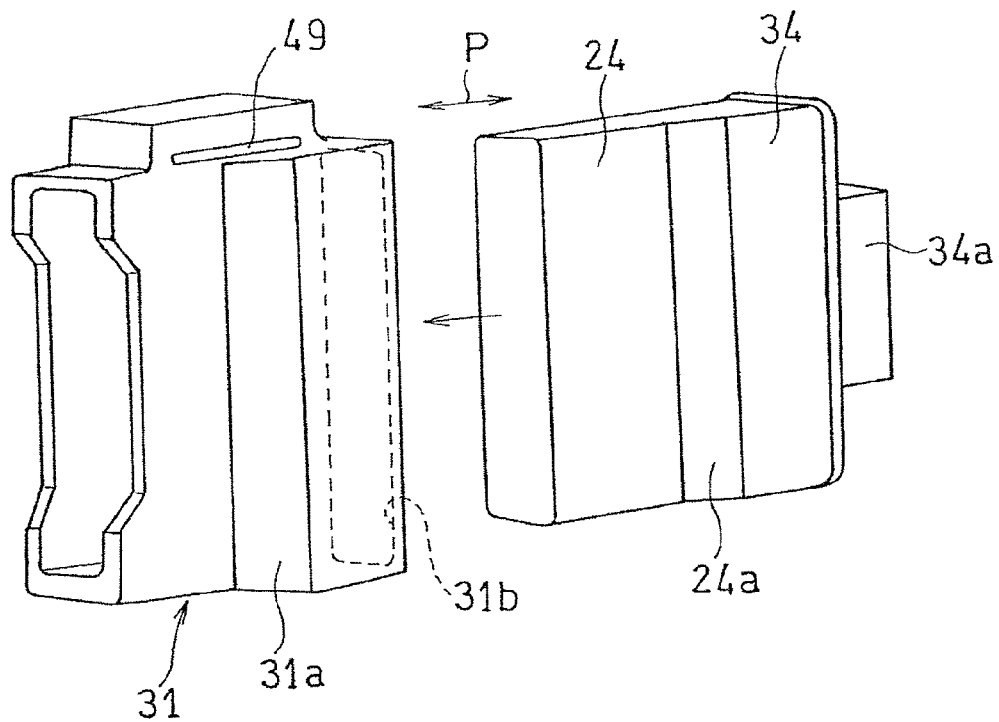
FIG. 7 is an exploded perspective view of the immobilizer amplifier mount structure.

The rubber case 31 shown in FIG. 2 holds the immobilizer amplifier 24, which has a substantially rectangular parallelpiped shape as described above, so as to cover and hold the immobilizer amplifier 24. As shown in FIG. 7, the immobilizer amplifier 24 is integrally formed (molded) together with a connector unit 34 having the amplifier connector 34a. The immobilizer amplifier 24 is fitted into the rubber case 31 through a rear opening 31b of the rubber case 31. The connector unit 34 is thicker than the immobilizer amplifier 24, so that an amplifier stepped portion 24a is formed as a tilted surface between the immobilizer amplifier 24 and the connector unit 34. A case stepped portion 31a is formed in the rubber case 31 so as to correspond to the amplifier stepped portion 24a. Support slits 49, 49 are formed in the rubber case 31 so as to penetrate through the rubber case 31. Specifically, the support slits 49, 49 are provided in upper and lower portions of the rubber casing 31 in the up-down direction perpendicular to an inserting/removing direction P for the immobilizer amplifier 24.

Figure 8:
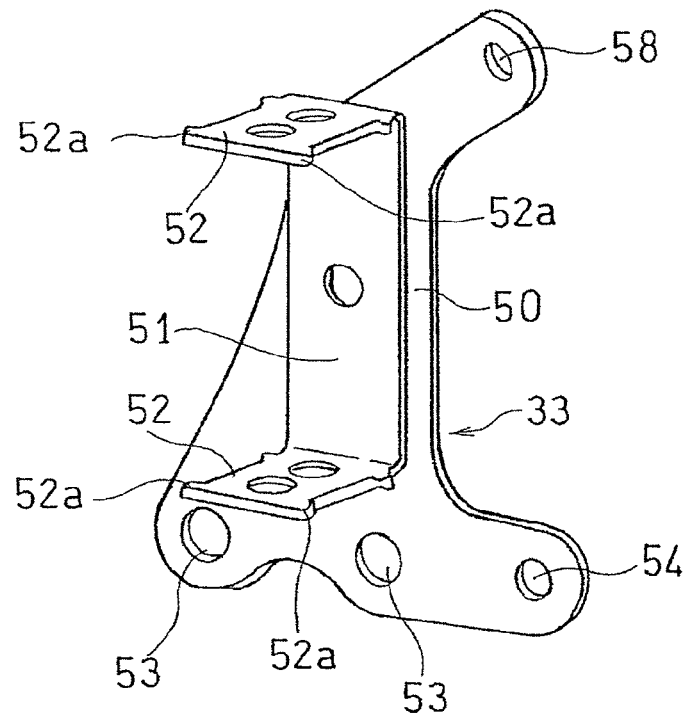
FIG. 8 is a perspective view of an amplifier bracket used for the immobilizer amplifier mount structure.

As shown in FIG. 8, the amplifier bracket 33 is formed by a support plate 51 having a U-like shape as viewed in the longitudinal direction and is joined to one surface of a flat-plate-shaped mount plate 50. Paired upper and lower support pieces 52, 52, that are formed so as to be bent on both end sides of the support plate 51, are inserted into the paired support slits 49, 49 of the rubber case 31, whereby the rubber case 31 that holds the immobilizer amplifier 24 is supported by the amplifier bracket 33. At this time, projections 52a that project in both lateral directions from a tip end portion of each of the support pieces 52, 52 pass through the support slits 49, 49 of the rubber case 31 so as to engage with the outer surface of the rubber case 31. Thus, the rubber case 31 is prevented from falling off the amplifier bracket 33.

On the other hand, the mount plate 50 has: two support holes 53, 53 that are aligned with the two mount holes 48, 48 of the engine mount 38; and two mount holes 54, 58 in which the harness holding portions 39, 40 (FIG. 2) such as a clamp made of a resin are inserted and mounted.

A procedure for mounting the immobilizer amplifier 24 to the main frame 1 of the motorcycle frame structure FR by using the rubber case 31, the amplifier bracket 33 and the engine mount 38 as shown in FIG. 2 will be described. Firstly, the immobilizer amplifier 24 integrated with the connector unit 34 as shown in FIG. 7 is fitted into an internal space of the rubber case 31 from the right side (the rear side) of FIG. 4. By so doing, the immobilizer amplifier 24 is held due to elastic restoring force of the rubber case 31 itself. In this state, the amplifier stepped portion 24a of the immobilizer amplifier 24 contacts with the case stepped portion 31a of the rubber case 31, thereby preventing the immobilizer amplifier 24 from falling off the rubber case 31 forward.

Figure 5:
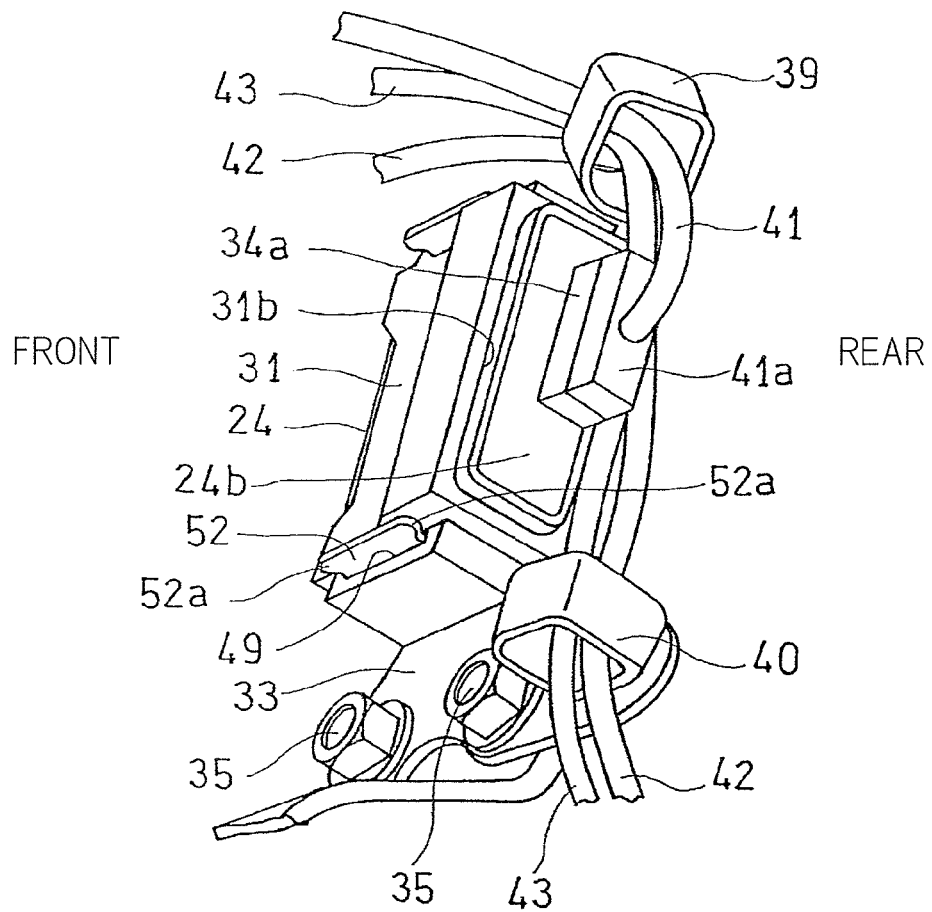
FIG. 5 is a perspective view of the immobilizer amplifier mount structure as viewed from the diagonally lower rear side thereof.

The rubber case 31 holding the immobilizer amplifier 24 is mounted to the amplifier bracket 33 as shown in FIG. 5. At this time, the paired support pieces 52, 52 of the amplifier bracket 33 are inserted through the paired support slits 49, 49 of the rubber case 31, and the projections 52 provided at the tip end portions of the support pieces 52, 52 protrude from the support slits 49, 49. Thus, the rubber case 31 is prevented from falling off the amplifier bracket 33. In this manner, the immobilizer amplifier 24 is stably mounted to the amplifier bracket 33 through the rubber case 31 with ease.

Figure 4:
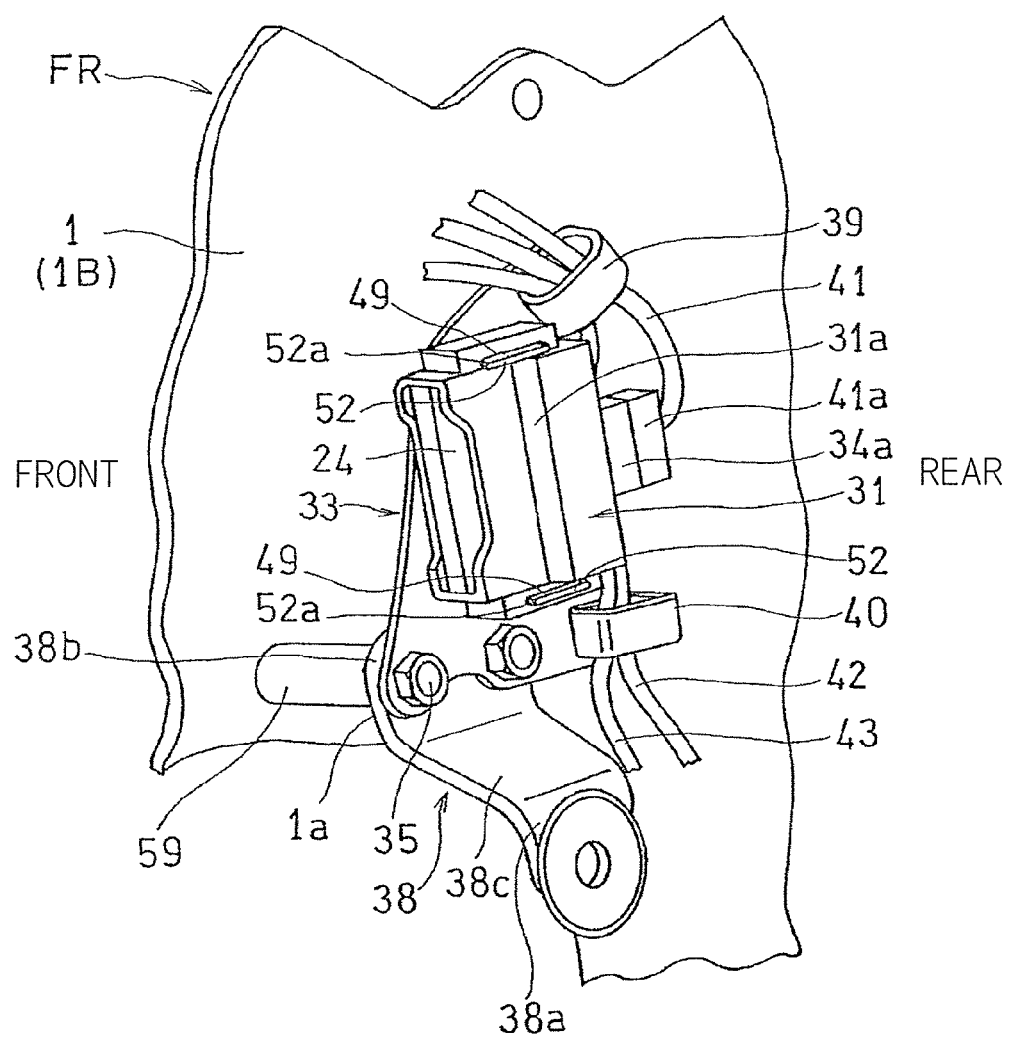
FIG. 4 is a perspective view of the immobilizer amplifier mount structure as viewed from the diagonally front side thereof.

The amplifier bracket 33 having the immobilizer amplifier 24 mounted thereto, is mounted to two bosses 59, 59 provided at the engine mount portion 1a at the inner surface of the right-side frame piece 1B, as shown in FIG. 4. At this time, the engine mount 38 is interposed between the bosses 59 and the amplifier bracket 33, and the two bolts 35, 35 are inserted into the paired mount holes 48, 48 (FIG. 6) of the engine mount 38 and the paired support holes 53, 53 of the amplifier bracket 33. Thereafter, the bolts 35, 35 are screwed into threaded holes of the bosses 59, 59, so as to fasten and fix both the amplifier bracket 33 and the engine mount 38 to the bosses 59, 59. Thus, the immobilizer amplifier 24 is stably supported by the engine mount portion 1a of the main frame 1 through the rubber case 31 and the amplifier bracket 33 by using a fastening structure of the engine mount 38.

Subsequently, the immobilization signal harness 41 wired from the immobilization signal output section 23 is inserted through one of the harness holding portions, that is, the harness holding portion 39. The pulser signal harness 42 and the oxygen sensor signal harness 43 are inserted through both the harness holding portions 39, 40. In this state, the harness holding portions 39 and 40 are inserted and mounted in the two upper and lower mount holes 58 and 54 (FIG. 8), respectively, of the amplifier bracket 33, and the connector 41a provided at the tip end portion of the immobilization signal harness 41 is connected to the amplifier connector 34a.

In the motorcycle immobilizer amplifier mount structure having the above configuration, the immobilizer amplifier 24 shown in FIG. 1 is provided separately from the ignition switch unit SU having the immobilization signal output section 23 incorporated therein, thereby enabling reduction in the size of the ignition switch unit SU. Further, the immobilizer amplifier 24 is disposed in the intermediate portion, in the longitudinal direction, of the motorcycle frame structure FR, whereby arrangement of the ignition switch unit SU, the radiator 26 and the like provided in the front portion of the motorcycle body can be simplified.

The immobilizer amplifier 24 is disposed rearward of the cylinder head 29 of the engine E, and in the intermediate portion of the motorcycle frame structure FR in the longitudinal direction, which is distant from the front portion, of the motorcycle body, at which front portion the temperature tends to become high due to proximity to the engine E. Thus, the immobilizer amplifier 24 is not greatly distant from the immobilization signal output section 23, and therefore, while wiring is facilitated, the immobilizer amplifier 24 does not suffer an adverse effect of heat due to the immobilizer amplifier 24 being exposed to high temperature of the engine E.

The immobilizer amplifier 24 is installed in the vicinity of the upper portion of the swing arm bracket 11 in the main frame piece 1B. In the vicinity of the upper portion of the swing arm bracket 11, there is a vacant space in many cases. Therefore, a sufficient mount space for the immobilizer amplifier 24 can be assuredly obtained with ease.

The immobilizer amplifier 24 is mounted to the main frame piece 1B of the motorcycle frame structure FR shown in FIG. 2 through the amplifier bracket 33. Although the immobilizer amplifier 24 has an outer shape for which existing holding means such as screwing is difficult to use in general, the immobilizer amplifier 24 can be firmly mounted to the motorcycle frame structure FR with ease through the amplifier bracket 33. When the immobilizer amplifier 24 is mounted, both the amplifier bracket 33 and the engine mount 38 are fastened together to the engine mount portion 1a (FIG. 4) disposed in the motorcycle frame structure FR, and the immobilizer amplifier 24 is mounted to the amplifier bracket 33. Thus, the engine mount portion 1a for the existing engine mount 38 is used to mount the amplifier bracket 33 to a motorcycle frame structure, thereby simplifying a mount structure for the immobilizer amplifier 24.

Further, since the amplifier bracket 33 is provided with the holding portions 39, 40 for the harnesses 41, 42, 43, holding portions for the harnesses 41, 42, 43 need not be separately provided, thereby improving the simplification of the structure.

The front end portion 25a, of the shock absorber 25 for the rear wheel 14, disposed at the center portion, in the widthwise direction, of the motorcycle body as shown in FIG. 3 is joined to the cross member 27 of the motorcycle frame structure FR, and the immobilizer amplifier 24 is installed laterally outward of the front end portion 25a. Since there is a relatively wide vacant space located laterally outward of the front end portion 25a of the shock absorber 25, a sufficient mount space for the immobilizer amplifier 24 can be assuredly obtained.

The present invention is not limited to the embodiment described above, and various additions, modifications, or deletions may be made without departing from the gist of the invention, and these are construed as included within the scope of the present invention. For example, according to the above mentioned embodiment, the immobilizer amplifier 24 is mounted on the inner surface of the right main frame piece 1B of the motorcycle frame structure FR. However, the immobilizer amplifier 24 may be mounted on the inner surface of the left main frame piece 1A of the motorcycle frame structure FR, or on the inner surface of one of the rear frame pieces 2A and 2B.

REFERENCE NUMERALS

1 . . . main frame (motorcycle frame structure)
1A, 1B . . . main frame piece (frame piece)
1a . . . engine mount portion
2 . . . rear frame (motorcycle frame structure)
2A, 2B . . . rear frame piece (frame piece)
11 . . . swing arm bracket
12 . . . swing arm
23 . . . immobilization signal output section
24 . . . immobilizer amplifier
25 . . . shock absorber
25a . . . front end portion of shock absorber
27 . . . cross member
29 . . . cylinder head
33 . . . amplifier bracket
38 . . . engine mount
39, 40 . . . harness holding portion
E . . . engine
FR . . . motorcycle frame structure

What is claimed is:
1. A motorcycle immobilizer amplifier mount structure for mounting an immobilizer amplifier configured to amplify an immobilization signal from an immobilization signal output section to a motorcycle frame structure, wherein:
   the immobilization signal output section is incorporated in an ignition switch unit;

the motorcycle frame structure includes a pair of left and right frame pieces; and the immobilizer amplifier is mounted rearward of a cylinder head of a combustion engine and on an inner side surface of a an intermediate portion, in a longitudinal direction, in the pair of left and right frame pieces.

2. The motorcycle immobilizer amplifier mount structure as claimed in claim 1, wherein the immobilizer amplifier is mounted to a portion, in the vicinity of an upper portion of a swing arm bracket, of the pair of left and right frame pieces.

3. The motorcycle immobilizer amplifier mount structure as claimed in claim 1, wherein the immobilizer amplifier is mounted to the motorcycle frame structure through an amplifier bracket.

4. The motorcycle immobilizer amplifier mount structure as claimed in claim 3, wherein both the amplifier bracket and an engine mount are fastened together by a common fastening member to an engine mount portion provided in the motorcycle frame structure, and the immobilizer amplifier is mounted to the amplifier bracket.

5. The motorcycle immobilizer amplifier mount structure as claimed in claim 3, wherein the amplifier bracket includes a harness holding portion.

6. The motorcycle immobilizer amplifier mount structure as claimed in claim 1, wherein:
- a shock absorber having a rear end portion joined to a swing arm that supports a rear wheel is disposed at a center portion, in a widthwise direction, of a motorcycle body;
- a front end portion of the shock absorber is joined to a cross member of the motorcycle frame structure; and
- the immobilizer amplifier is disposed laterally outward of the front end portion of the shock absorber.

* * * * *